United States Patent Office 3,417,613
Patented Dec. 24, 1968

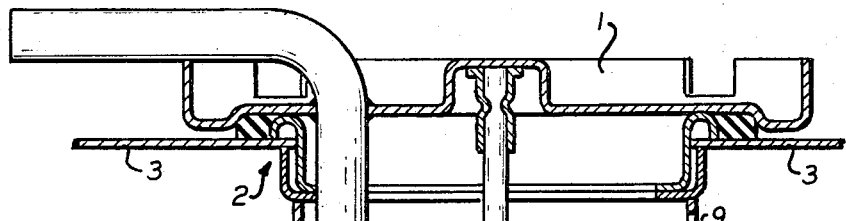
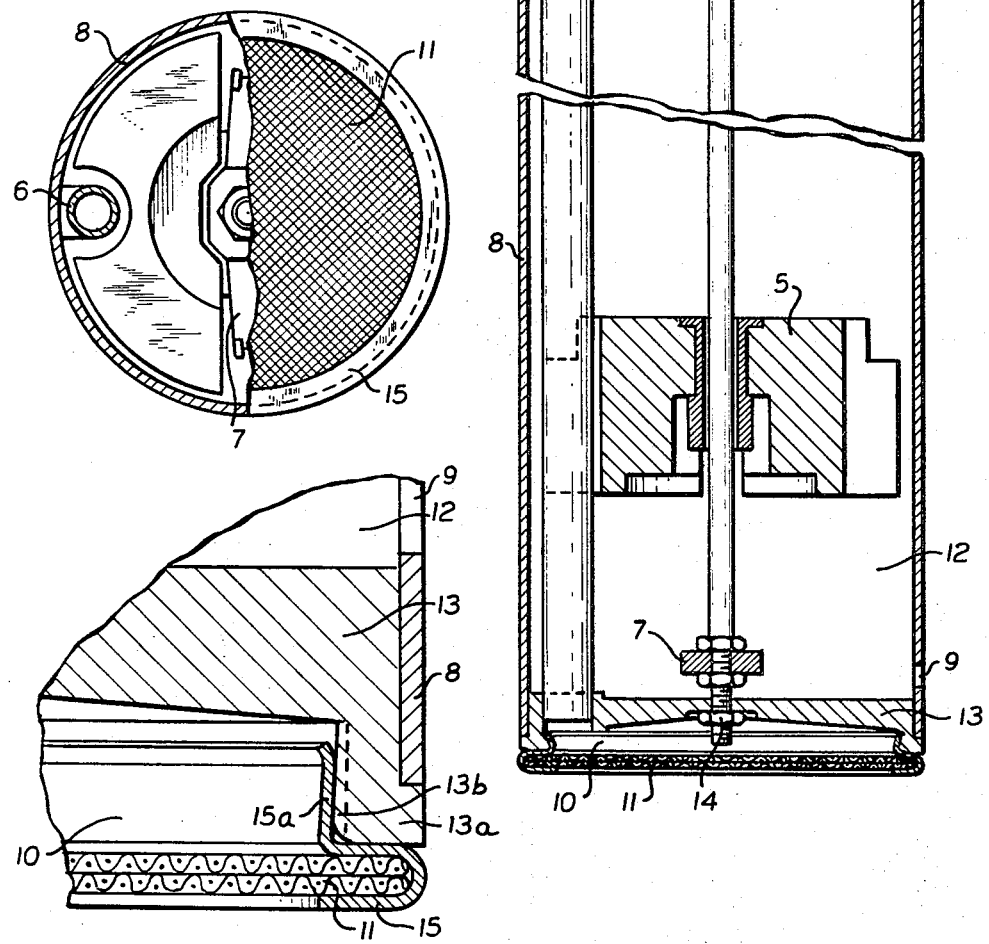

3,417,613
IMMERSED TUBE LEVEL INDICATOR IN
AUTOMOTIVE VEHICLES
Ingo Barnstorf, Frankfurt am Main-Sossenheim, Germany, assignor to VDO Tachometer Werke Adolf Schindling G.m.b.H., Frankfurt am Main, Germany, a corporation of Germany
Filed Jan. 27, 1967, Ser. No. 612,164
Claims priority, application Germany, Feb. 4, 1966, V 30,298
11 Claims. (Cl. 73—319)

ABSTRACT OF THE DISCLOSURE

The present invention relates to an immersed tube indicator for the electrical measuring of the tank content, wherein a measuring float is guided in the immersed tube for axial movement and a suction tube is disposed in the immersed tube. A closure member closes up a tank opening and carries an indicator, and a fuel filter is disposed in the suction mouth of the immersed tube, the bottom of the latter defining a suction chamber.

---

The present invention relates to an immersed tube level indicator structure, in general, and to an immersed tube level indicator structure for an electrical measuring of the tank contents in automotive vehicles including a sensing float guided in an immersed tube and a suction tube for the fuel, in particular, a fuel filter is disposed on a suction mouth, the suction tube extending through the immersed tube carrying closing cover of the tank opening.

It is the purpose of the present invention to combine structurally the known immersed tube indicator device for an electrical measuring of the tank contents, which is set into an opening of the upper tank wall of a closing cover with the suction tube for the fuel and with a fuel filter disposed on its suction mouth, such that the indicator device constitutes a complete apparatus unit with the suction device. It is already known to provide the liquid level-indication device, as well as the filling tube and the tapping tube on a common cover of a liquid container (German Auslegeschrift 1,201,070). This known structure is, however, comparatively voluminous, does not constitute a closed apparatus unit and is also not suitable for fuel tanks in automotive vehicles.

It is furthermore known to pass the suction tube for the fuel through the closing cover of a float lever indicator device for an electrical fuel level indication in vehicles and to provide at its suction end a fuel filter adjacent the indicating device. This known structure likewise does not constitute a closed apparatus unit and can be easily damaged during the transportation upon delivery for the continuous assembly in automotive vehicles.

It is, therefore, one object of the present invention to provide an immersed tube indicator device for an electric measuring of the tank contents in automotive vehicles, wherein the bottom of the immersed tube of the immersed tube indicator device is designed as a suction chamber in which the suction tube disposed inside of the immersed tube terminates, and which provides the bottom side of the suction chamber forming the closure of the immersed tube as a fuel filter. By this arrangement, the suction chamber comprises a cup-shaped part separating the suction chamber from the float chamber of the immersed tube indicator device, which cup-shaped part is insertable cover-like into the end of the immersed tube, and which suction chamber comprises further a fuel filter closing the suction chamber and secured to the edge of the cup-shaped part. The fuel filter is built into a ring which is releasably secured to the edge of the cup-shaped part of the suction chamber by means of resting means. In a particular embodiment of the present invention, a guide rod of the measuring float secured in the closing cover of the tank opening extends through a bore in the cup-shaped part of the suction chamber and the immersed tube with the inserted cup-shaped part is retained by securing the latter to the guide rod on the closing cover.

With these and other objects in view which will become apparent in the following detailed description, the present invention will be clearly understood in connection with the accompanying drawing, in which:

FIGURE 1 is an axial section of the apparatus unit;
FIG. 2 is a bottom plan view of the immersed tube, partly in section; and
FIG. 3 is a fragmentary section of a bottom portion of the apparatus unit, disclosed in FIG. 1, at an enlarged scale.

Referring now to the drawing, the apparatus comprises a closing cover 1, which is secured to a wall 3 of the upper side of the tank of an automotive vehicle by means of a bayonet joint 2, and carries at its bottom side a guide rod 4 for a sensing float 5. A suction tube 6 leading to a fuel pump of the vehicle furthermore extends through the closure cover 1 and is tightly soldered thereto. At the lower end of the guide rod 4 for the sensing float 5 is securingly disposed a clamp clip 7 of insulating material, on which clamp clip 7 are secured slide wires of resistance material constituting the sensing portion of the indicator circuit (not shown) for the electric measuring of the tank contents. The lead-in of these slide wires through the closure cover 1 has been omitted in the drawing for the purpose of clearer demonstration. The slide wires are short-circuited for the measuring of the contents in a known manner by means of a contact bridge (not shown) disposed on the float 5 at the prevailing level of the fuel.

The indicator arrangement, together with the sensing float and also the suction tube 6, are surrounded by an immersed tube 8 for their protection, which immersed tube 8 has a plurality of small openings 9 at its lower end for feeding in of the fuel and at its upper end for venting. In accordance with the present invention, the bottom of this protection tube, which is normally integrally formed with the immersed tube, is designed as a suction chamber 10, into which the suction tube 6 terminates and the bottom side forming the closure of the immersed tube 8 is designed as a fuel filter 11.

The suction chamber 10 is defined by a cup-shaped part 13 separating the suction chamber 10 from the float chamber 12 and by the fuel filter 11 secured at its edge. The cup-shaped part 13 is insertable cover-like into the bottom opening of the immersed tube 8 and engages with an edge 13a the end of the immersed tube 8. The guide rod 4, for the float 5, secured in the closure cover 1 of the tank opening, extends through a bore in the cup-shaped part 13 of the suction chamber 10. During the assembly, the immersed tube 8 with the inserted cup-shaped part 13 is moved over the indicator arrangement and the suction tube 6 until it sits on the closure cover 1 and is then clamped and retained by securing the cup-shaped part 13 on the guide rod 4, for instance by means of a screw nut 14, against the closure cover 1.

The fuel filter 11 is flanged in a sheet metal ring 15 which has an extension 15a reaching into the suction chamber 10. This extension 15a is slightly conically widened inwardly and its inner edge is again slightly bent in, so that the latter forms a weak bead. The inner surface of the edge 13a of the cup-shaped part 13 is likewise slightly conically widened inwardly and a plurality of stop notches 13b are disposed at its periphery, so that the fuel filter 11 with its bead-shaped edge of the sheet metal ring 15a can rest in the edge portion 13a of the cup-shaped part 13.

As it is indicated in the drawings by example, the assembly of the immersed tube indicator with the suction device for the fuel and the structure of the bottom of the immersed tube as suction chamber with filter provides, in accordance with the present invention, an extremely advantageous closed apparatus unit, not only for the manufacture, but also for the assembly in the automotive vehicle and also for the operation, due to easy exchange or cleaning of the filter.

While I have disclosed one embodiment of the present invention, it is to be understood that this embodiment is given by example only and not in a limiting sense, the scope of the present invention being determined by the objects and the claims.

I claim:
1. An immersed tube indicator apparatus for the electrical measuring of fuel tank contents, comprising
   an immersed tube,
   a sensing float guided in said immersed tube,
   a suction tube for the fuel tank contents,
   a closure cover against said immersed tube adapted to close up a tank opening and adapted for supporting a portion of an indicator circuit,
   said immersed tube having an open bottom end,
   wall means disposed adjacent the bottom of said immersed tube closing the latter and defining and separating a float chamber and a cup-shaped suction chamber in fluid isolation from one another, and defining both chambers substantially within said immersed tube,
   said wall means forming a fuel filter opening exclusively at the bottom of said suction chamber substantially adjacent and sealingly arranged to the bottom end of said immersed tube and constituting a suction mouth,
   a fuel filter disposed in said fuel filter opening on said suction mouth,
   said sensing float disposed in said float chamber, and
   said suction tube passing through the inside of said immersed tube through said float chamber and said wall means into said suction chamber.

2. The immersed tube indicator apparatus, as set forth in claim 1, wherein
   said fuel filter is detachably disposed in said fuel filter opening of said wall means.

3. The immersed tube indicator apparatus, as set forth in claim 1, wherein
   said wall means is a cup-shaped member having an edge portion and adapted to be inserted cover-like into said immersed tube adjacent said open bottom end and separating said chambers in the axial direction, and
   said fuel filter operatively detachably secured to said edge portion of said cup-shaped member enclosing in liquid communication said lowermost side of said suction chamber.

4. The immersed tube indicator apparatus, as set forth in claim 3, wherein said edge portion is radially directed outwardly forming an annular upper abutment surface complementarily abutting said open bottom end of said immersed tube.

5. The immersed tube indicator apparatus, as set forth in claim 3, which includes
   a guide rod extending through said float chamber, a sensing float axially movable in and guided by said guide rod,
   first means for securing said guide rod to said closure cover of said tank opening,
   said cup-shaped member has an axial bore,
   said guide rod extends through said axial bore of said cup-shaped member,
   second means for securing said guide rod to said cup-shaped member, and
   said immersed tube is retained in a position engaging said closure cover by said inserted cup-shaped member.

6. The immersed tube indicator apparatus, as set forth in claim 5, wherein
   at least one of said securing means is a releasable securing means.

7. The immersed tube indicator apparatus, as set forth in claim 3, which includes
   a ring member releasably secured to said edge portion of said cup-shaped member.

8. The immersed tube indicator apparatus, as set forth in claim 7, wherein
   said fuel filter is of disc configuration and mounted in said ring member.

9. The immersed tube indicator apparatus, as set forth in claim 8, wherein
   said edge portion of said cup-shaped member includes an inner surface facing said suction chamber, and
   said ring member includes an extension complementary to said inner surface for releasable engagement therewith.

10. The immersed tube indicator apparatus, as set forth in claim 9, wherein
    said wall means inner surface and said extension slightly conically widen away from said fuel filter opening.

11. The immersed tube indicator apparatus, as set forth in claim 10, wherein
    the upper extreme end of said extension is slightly turned radially inwardly forming a weak bead, and said wall means inner surface is formed with a plurality of stop notches cooperating with said extension.

References Cited

UNITED STATES PATENTS

| | | |
|---|---|---|
| 3,113,282 | 12/1963 | Coleman. |
| 3,266,312 | 8/1966 | Coleman et al. _____ 73—313 |
| 3,348,413 | 10/1967 | Zimmerle _____ 73—313 |

S. CLEMENT SWISHER, *Acting Primary Examiner.*

D. M. YASICH, *Assistant Examiner.*

U.S. Cl. X.R.

73—313